(12) United States Patent
Sandro et al.

(10) Patent No.: US 7,464,798 B2
(45) Date of Patent: *Dec. 16, 2008

(54) HYDRAULIC BICYCLE BRAKE MECHANISM

(76) Inventors: Montanari Sandro, 5F-2, No. 181, Sec. 2, Mei-Tsun Rd., Taichung City (TW); Righi Ermanno, 5F-2, No. 181, Sec. 2, Mei-Tsun Rd., Taichung City (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/414,198

(22) Filed: May 1, 2006

(65) Prior Publication Data

US 2007/0251768 A1 Nov. 1, 2007

(51) Int. Cl.
*B62L 3/00* (2006.01)
(52) U.S. Cl. ................................ 188/24.22; 188/24.11
(58) Field of Classification Search ................ 188/344, 188/24.11, 24.12, 24.14, 24.15, 24.16, 24.17, 188/24.21, 24.22, 2 D See application file for complete search history.

(56) References Cited

U.S. PATENT DOCUMENTS

| | | | | | |
|---|---|---|---|---|---|
| 735,113 | A | * | 8/1903 | Kelland et al. | 188/24.18 |
| 5,431,257 | A | * | 7/1995 | Rocca et al. | 188/24.21 |
| 5,743,284 | A | * | 4/1998 | Lumpkin | 188/24.22 |
| 5,743,360 | A | * | 4/1998 | Ke | 188/24.19 |
| 6,220,399 | B1 | * | 4/2001 | Phillips et al. | 188/24.21 |
| 7,000,739 | B2 | * | 2/2006 | Ciamillo | 188/24.22 |
| 2005/0061587 | A1 | * | 3/2005 | Tsai | 188/24.14 |

* cited by examiner

*Primary Examiner*—Robert A. Siconolfi
*Assistant Examiner*—James K Hsiao

(57) ABSTRACT

A bicycle brake mechanism includes a body located above a front wheel and a pivotable member is pivotably connected to the body. A hydraulic device is connected to the pivotable member so as to pivot the pivotable member. Two brake arms are located on two sides of the rim and two respective first ends of two link units are respectively connected to two ends of each of the brake arms. The two respective second ends of the links units are connected to two ends of the body. One end of each of the two brake arms is pushed by the pivotable member when the hydraulic device is activated so as to pull the pivotable member. The two link units make the two brake arms to be simultaneously moved to stop the rim.

7 Claims, 7 Drawing Sheets

HYDRAULIC BICYCLE BRAKE MECHANISM

FIELD OF THE INVENTION

The present invention relates to a hydraulic bicycle brake mechanism which includes a link mechanism driven by a hydraulic device so as to move the two brake pads simultaneously.

BACKGROUND OF THE INVENTION

Conventional brake systems includes disk brake system and caliper brake system. The disk brake system includes complicated mechanism and can brake the wheel sharply, the caliper brake system is economically manufactured and is suitable for stop wheels at slow speed. The disk brake system uses hydraulic oil to activate the brake action and the caliper brake system uses brake cables to pivot two brake pads to stop the wheel. The brake cable is connected to a yoke cable which has two ends respectively connected to two brake arms so that when the brake cable pulls the yoke cable, the two brake arms are pivoted and the brake pads on the two brake arms are move to stop the wheel. It is noted that the two brake pads cannot contact the rim simultaneously, in other words, one of the pads contacts the rim first so that the rim is applied by a force in one direction, and then the other brake pad contact the rim in opposite direction. Because at the beginning of the braking action, only one brake pad is in contact with the rim so that the speed of rim does not reduces as desired and the brake distance is therefore prolonged.

The present invention intends to provide a bicycle hydraulic brake mechanism whose brake pads are moved to stop the wheel rim simultaneously by a link mechanism which is activated by a hydraulic mechanism.

SUMMARY OF THE INVENTION

The present invention relates to a bicycle brake mechanism which comprises a body located above a front wheel and a pivotable member is pivotably connected to the body. The pivotable member is connected to a hydraulic device which pivots the pivotable member when the brake lever is pulled. Two brake arms are located at inside of the body and movably connected to the body by two tubes extending through two elongate holes in the body. Each brake arm has a brake pad connected thereto. The two tubes are in contact with the pivotable member so that the two brake arms are moved when the pivotable member is pivoted by operation of the hydraulic device. Two link units are pivotably connected to two ends of each of the brake arms and the body so that the two brake arms are moved simultaneously by the two link units.

The main object of the present invention is to provide a brake mechanism which uses a hydraulic device to pivot the pivotable member which pivots the link mechanism to simultaneously move the brake arms to stop the rim with less effort.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
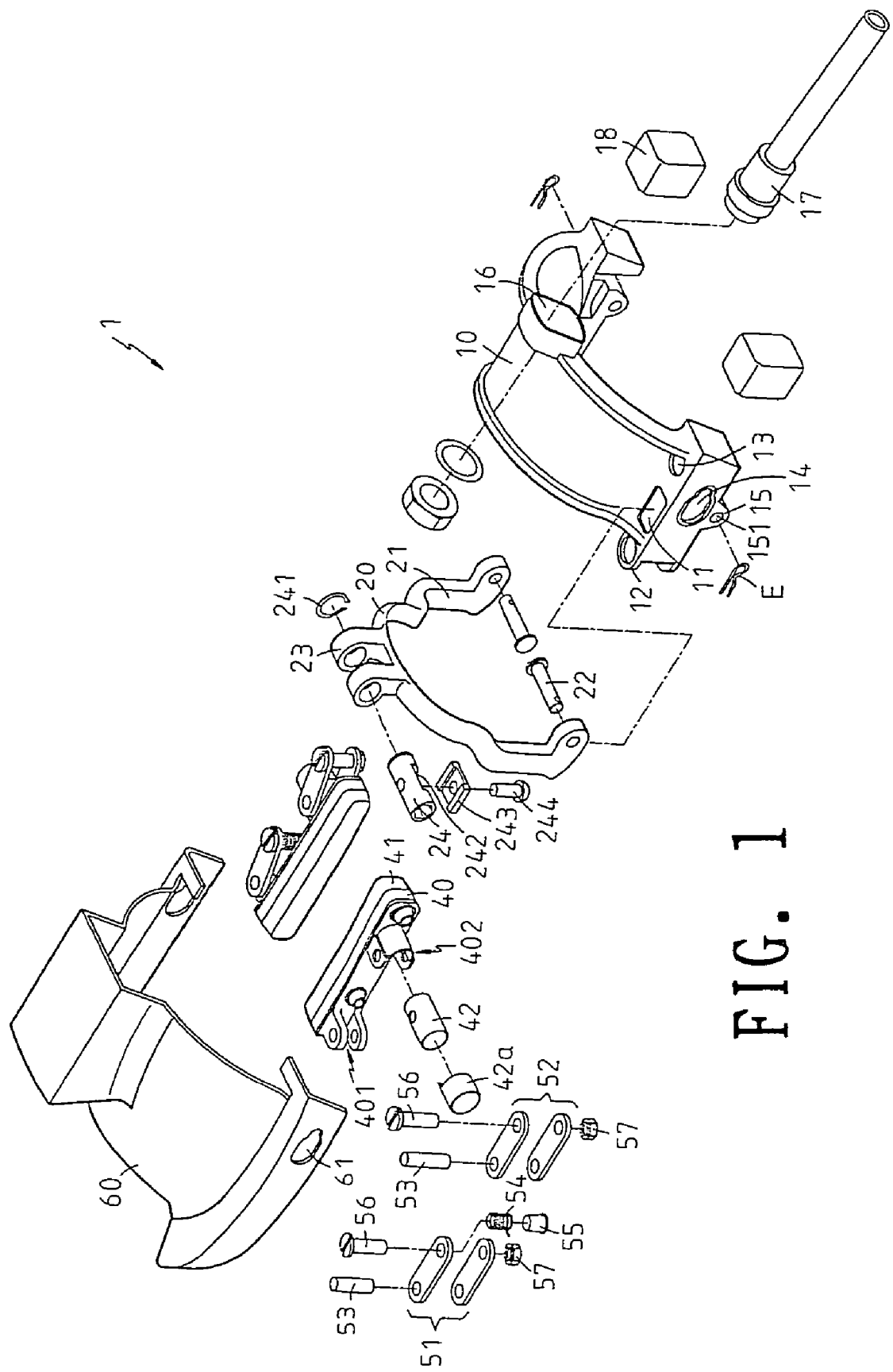
FIG. 1 is an exploded view to show the brake mechanism of the present invention.
Figure 2:
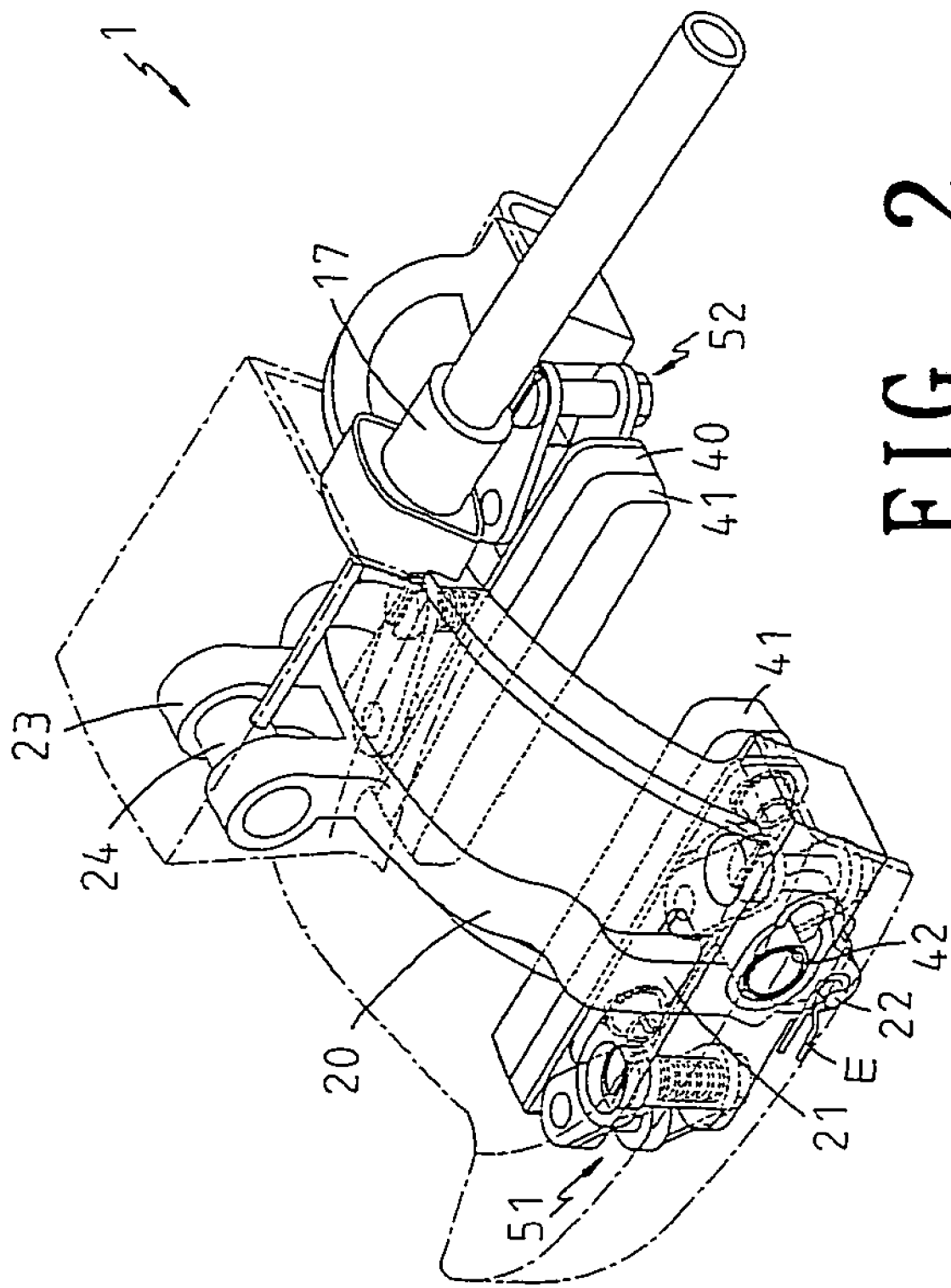
FIG. 2 is a perspective view to show the brake mechanism of the present invention.
Figure 3:
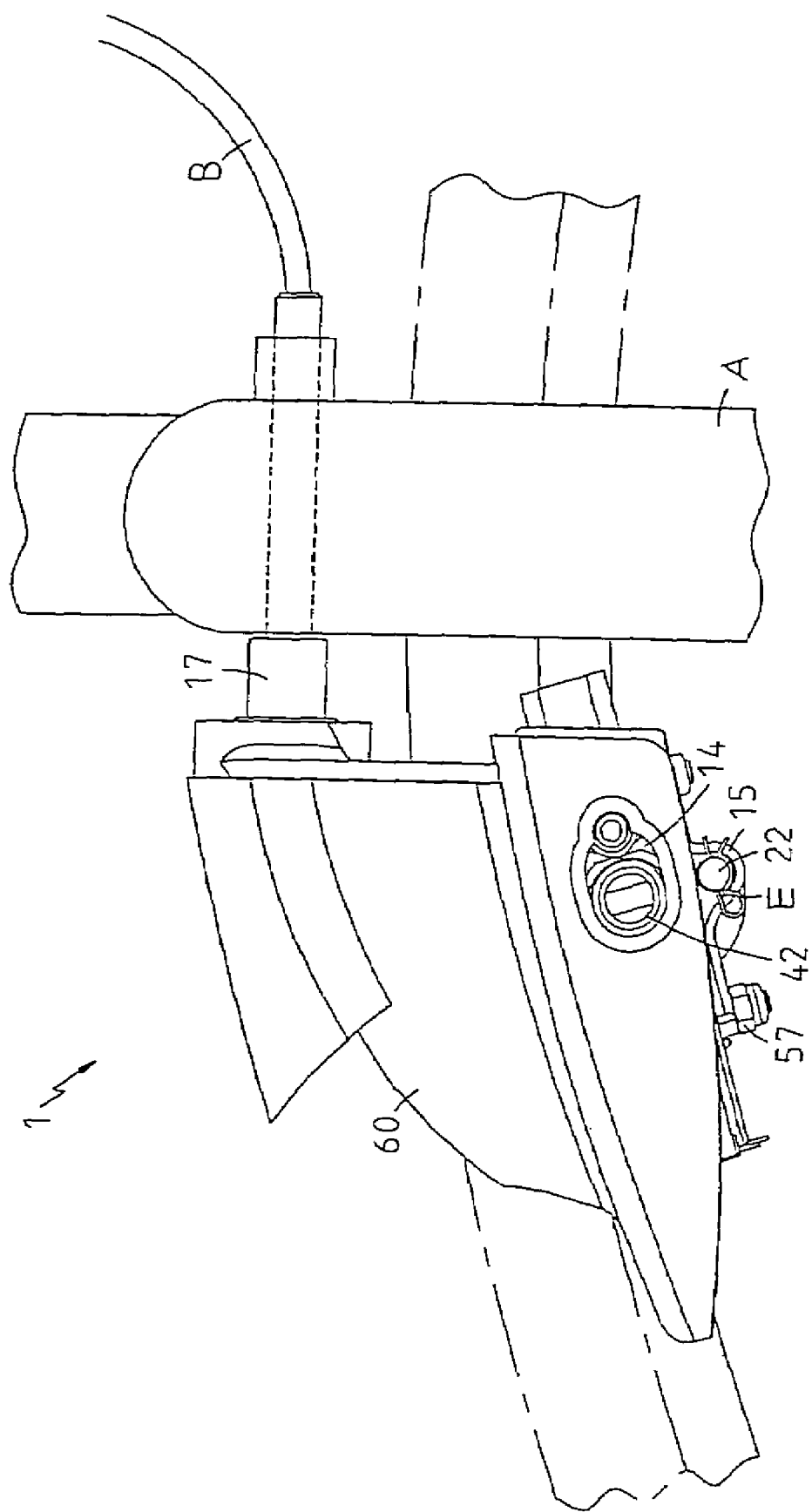
FIG. 3 is a side view to show the brake mechanism of the present invention.
Figure 4:
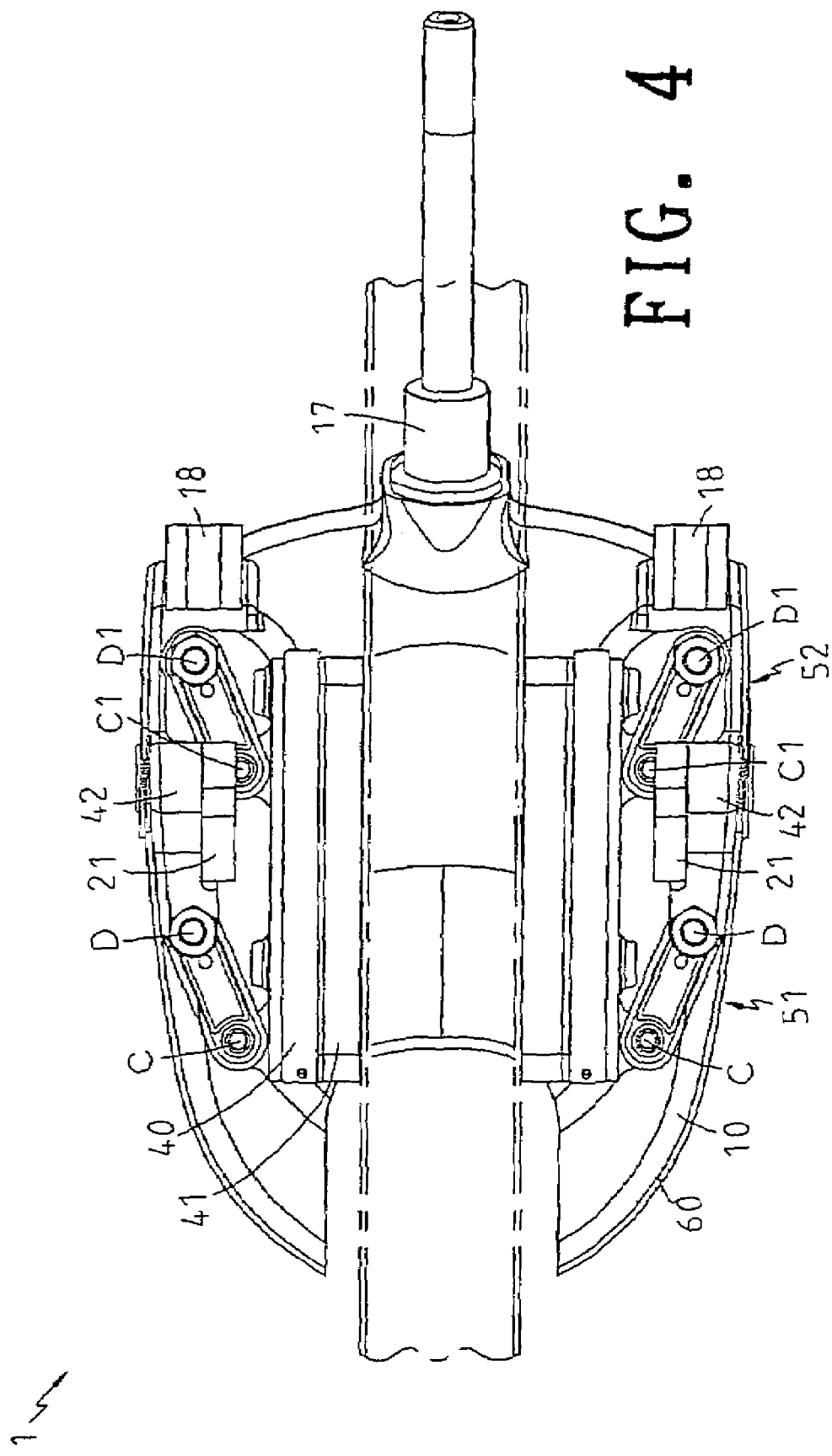
FIG. 4 is a bottom view to show the link units when the brake cable is pulled.
Figure 5:
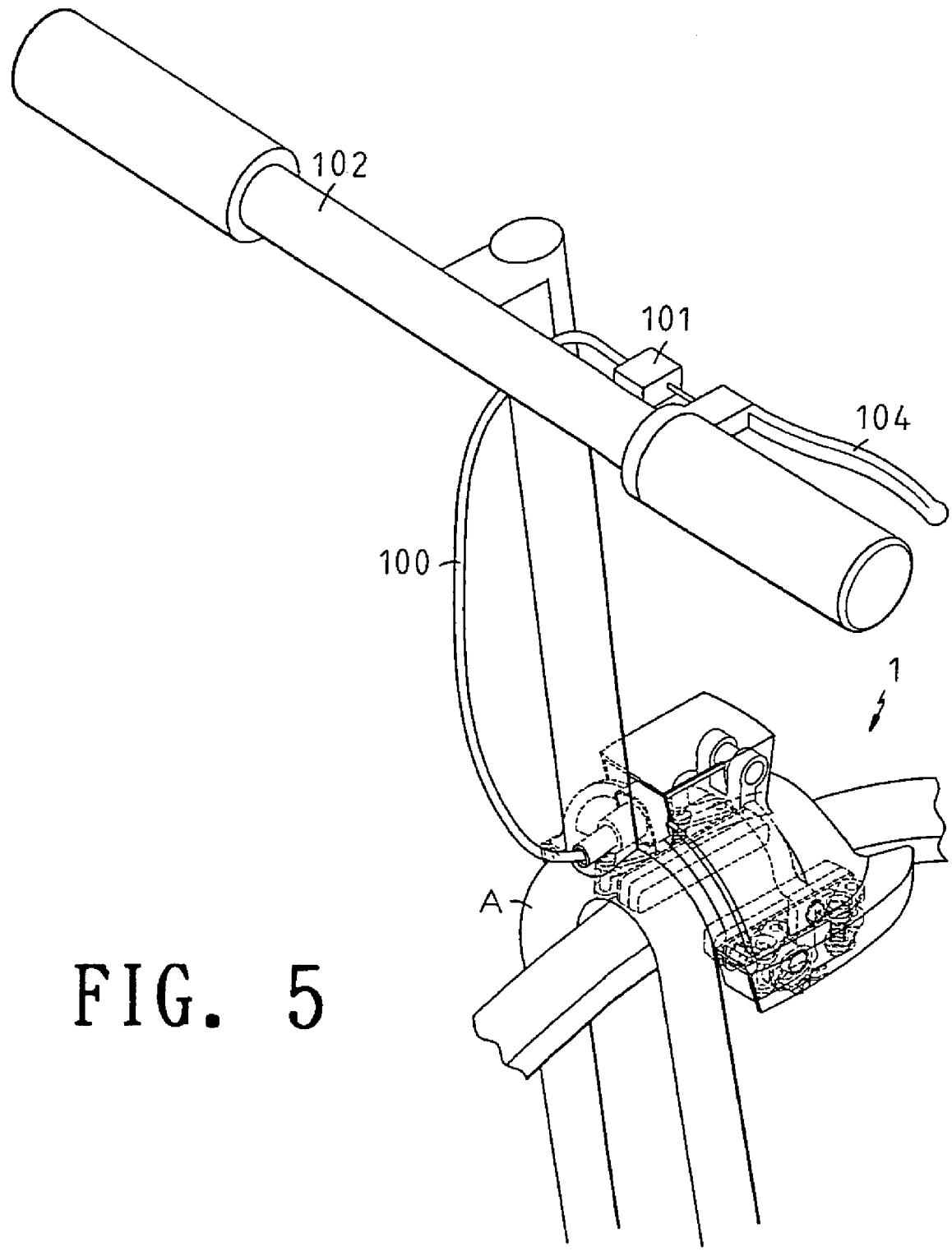
FIG. 5 is a perspective view to show the brake mechanism connected to a bicycle.
Figure 6:
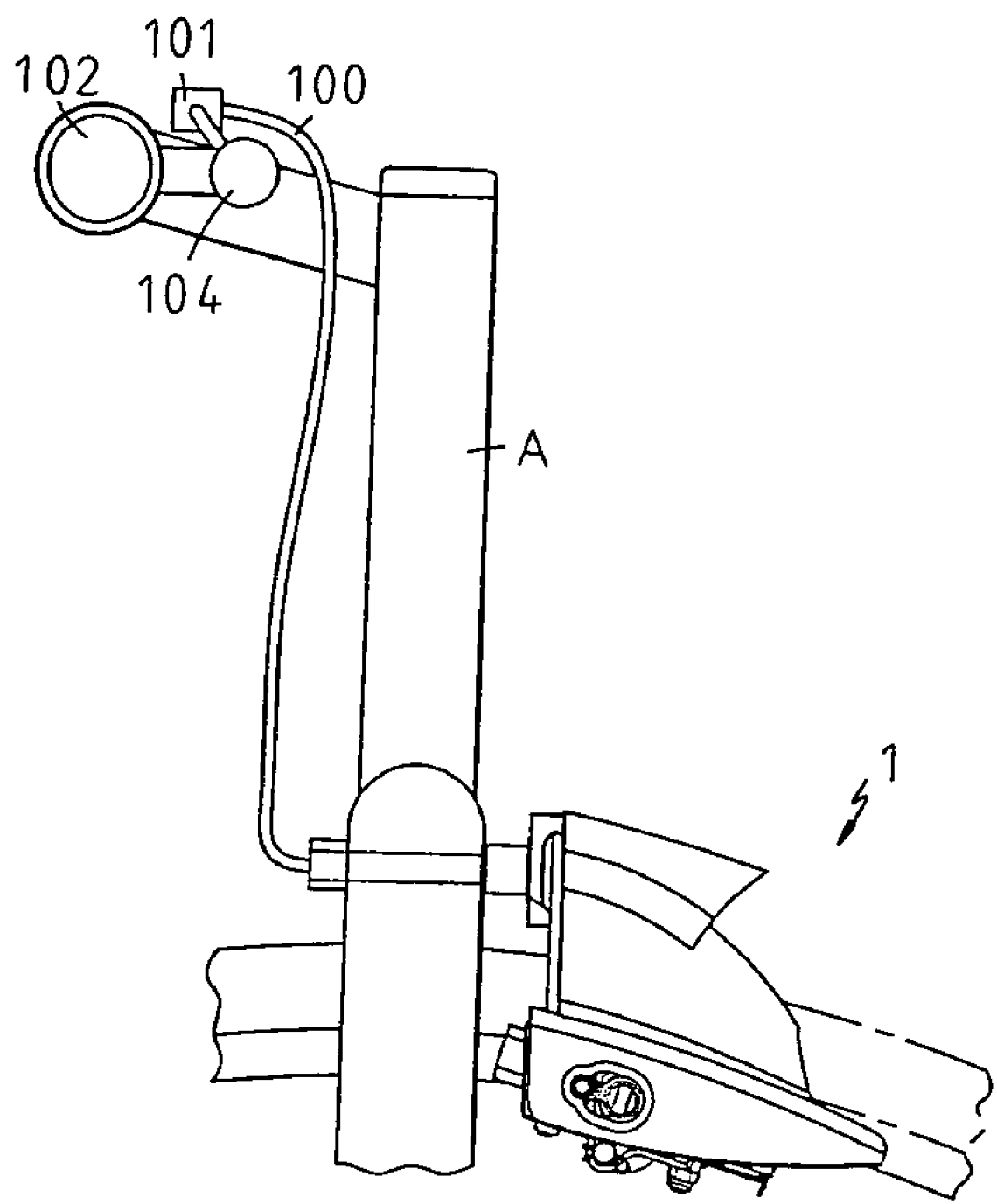
FIG. 6 shows a side view of the brake mechanism on the bicycle in FIG. 5.

Referring to FIGS. 1 to 6, the bicycle brake mechanism 1 of the present invention comprises a U-shaped body 10 which is located above a front wheel and a through hole 16 is defined in a top of the body 10. A connector 17 is engaged with the through hole 16 so that a hydraulic pipe 100 is connected between the connector 17 and a hydraulic device 101 which is connected with a brake lever 104 on the handlebar 102. An operation cable extends from the connector 17 and is connected with a pivotable member 20 which will be described hereinafter. Two slots 11 are defined through two respective tops of two ends of the body 10 and two first elongate holes 14 are defined through a side of each of the two ends of the body 10, wherein the side is vertical to the top of each of the two ends of the body 10. Two plates 15 extend from two respective lower edges of the two ends of the body 10 and two connection lugs 12 extend from a first end of the two ends of the body 10 and located opposite to the front fork "A". Two cushion members 18 are connected to the two respective second ends of the two ends of the body 10 so as to prevent from impact between the front fork "A" and the body 10.

The pivotable member 20 is a substantially U-shaped member and includes two legs 21 which movably extend through the two slots 11 and each leg 21 includes an L-shaped end. Two pins 22 extend through the two L-shaped ends and two holes 151 in the two plates 15 to pivotably connect the pivotable member 20 to the body 10. The two pins 22 each have an aperture and a spring clip "E" extends through the aperture to prevent the pin 22 from being pulled backward through the hole 151 in the plate 15 of the body 10. The pivotable member 20 has two top lugs 23 on a center thereof and a securing unit is connected to the two top lugs 23. The securing unit includes a tubular member 24 which extends through the two top lugs 23 and includes a recess 242 defined in an outer periphery thereof. The tubular member 24 has a groove defined in an outer periphery of an end thereof and a C-clip 241 is engaged with the groove to position the tubular member 24 such that the tubular member 24 is not disengaged from the two top lugs 23. A securing plate 243 is engaged with the recess 242 and a bolt 244 extends through the securing plate 243 so as secure the operation cable extending from the connector 17 between the securing plate 243 and the recess 242.

Two brake arms 40 are located at inside of the body 10 and movably connected to the body 10 by two tubes 42. Each of the brake arms 40 has a brake pad 41 connected thereto and the two brake pads 41 are located on two sides of the wheel rim. The two tubes 42 are located on two respective horizontal sections of the L-shaped ends of the pivotable member 20 so that the two brake arms 40 are moved to stop the wheel rim when the pivotable member 20 is pivoted. Each of the brake arms 40 has two first lugs 401 extending from a first end thereof and two second lugs 402 extending from a second end thereof. The two tubes 42 are respectively connected to the second lugs 402 of the two brake arms 40 and extend through two first elongate holes 14 defined through the two ends of the body 10. Each of the tubes 42 has an end cap 42a connected to a distal end thereof to ensure that the tubes 42 will not drop from the first elongate holes 14 of the body 10.

Two link units are pivotably connected to two ends of each of the brake arms 40 and the body 10 so that the two brake arms 40 are moved simultaneously. Each of the link units includes two first links 51 and two second links 52, each of the first and second links 52 is an ova plate. The first links 51 have two respective first ends pivotably connected to the first lugs 401 of each of the two brake arms 40, two respective second ends of the first links 51 are pivotably connected to connection lugs 12 on the body 10. The first links 52 have two respective first ends pivotably connected to the second lugs 402 of each of the two brake arms 40, two respective second ends of the second links 52 are pivotably connected to a through hole 13 in each of the two ends of the body 10.

A rod 53 extends through the first end of each of the first links 51 and the first lugs 401 of each of the brake arms 40 to form a first pivotable portion "C". A bolt 56 extends through the second end of each of the first links 51, a torsion spring 54, a support tube 55 for receiving the torsion spring 54 and the connection lugs 12 of each end of the body 10 and is connected to a nut 57 so as to form a first positioning portion "D". Another rod 53 extends through the first end of each of the second links 52, the tube 42 between the second lugs 402 and the second lugs 402 of each of the brake arms 40 to form a second pivotable portion "C1". Another bolt 56 extends through the second end of each of the second links 52 and the through hole 13 of the body 10 and is connected with another a nut 57 so as to form a second positioning portion "D1".

A top cap 60 is mounted on the body 10 and includes two second elongate holes 61 which are in alignment with the first elongate holes 14 of the body 10, the tubes 42 extend through the two second elongate holes 61.

Figure 7:
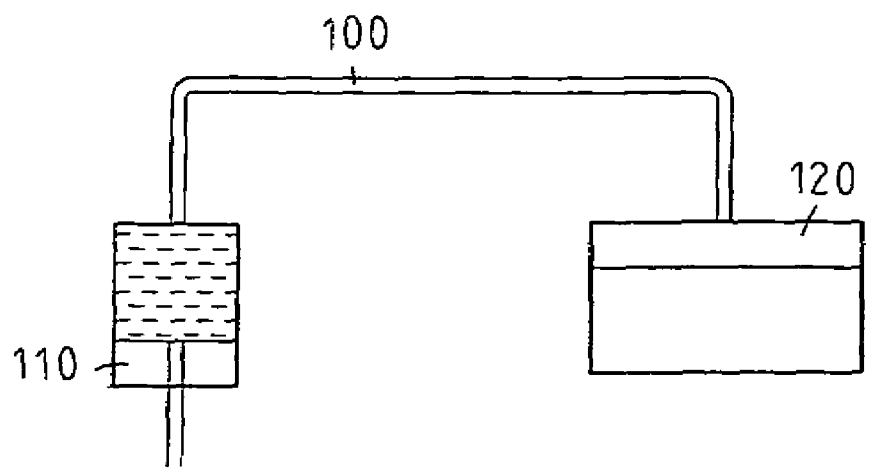
FIG. 7 illustrates the hydraulic mechanism when the brake lever is not yet pulled.
Figure 8:
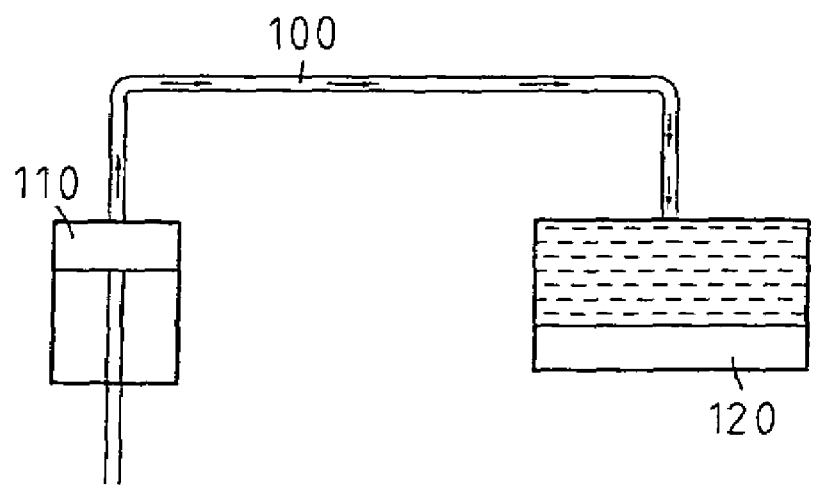
FIG. 8 illustrates the hydraulic mechanism when the brake lever is pulled.

Referring to FIGS. 7 and 8, when the brake lever 104 is not yet pulled, the reservoir is filled with hydraulic oil and the first piston 110 is located at a lower position. When the brake lever 104 is pulled, the first piston 110 is pushed upward to send the hydraulic oil out from the reservoir and enters into the second reservoir via the hydraulic pipe 100. The hydraulic oil moves the second piston 120 downward and drives the operation cable which pulls the pivotable member 20 to pivot about the two pins 22 and toward the connector 17 such that the two tubes 42 on the two brake arms 40 are pulled by the two legs 21 of the pivotable member 20. The first and second links 51, 52 are pivoted about the first and second pivotable portion "C" and "C1" and the two brake arms 40 are moved inward to stop the wheel rim. The first and second links 51, 52 are located symmetrically relative to the wheel rim so that the two brake pads 41 of the brake arms 40 simultaneously contact the wheel rim. It is noted that the torsion springs 54 each have a first end connected to the body 10 and the other end of the torsion spring 54 is connected to the support tube 55. When the brake lever 104 is released, the brake arms 40 are pivoted back to their original positions by the torsion springs 54.

The hydraulic pipe 100 extends through the front fork "A" so that the length of the hydraulic pipe that is exposed is reduced.

While we have shown and described the embodiment in accordance with the present invention, it should be clear to those skilled in the art that further embodiments may be made without departing from the scope of the present invention.

What is claimed is:

1. A bicycle brake mechanism comprising:
   a U-shaped body adapted to be located above a front wheel and two slots defined through two respective tops of two ends of the body, a pivotable member having two legs which extend through the two slots, two pins extending through the two legs and pivotably connecting the two legs to the body;
   two brake arms located at inside of the body and movably connected to the body by two tubes, each brake arm having a brake pad connected thereto, the two tubes being in contact with the pivotable member so that the two brake arms are moved when the pivotable member is pivoted, two link units pivotably connected to two ends of each of the brake arms and the body so that the two brake arms are moved simultaneously, and
   a hydraulic device including a hydraulic pipe connected between a brake lever and a connector which is connected to the body, an operation cable movably extending from the connector and pivotably connected to the pivotable member.

2. The mechanism as claimed in claim 1, wherein each of the brake arms has two first lugs extending from a first end thereof and two second lugs extending from a second end thereof, the two tubes are respectively connected to the second lugs of the two brake arms and extend through two first elongate holes defined through the two ends of the body.

3. The mechanism as claimed in claim 1, wherein each of the link units includes two first links and two second links, the first links have a first end pivotably connected to the first lugs of each of the two brake arms, a second end of the first links are pivotably connected to connection lugs on the body, the first links have a first end pivotably connected to the second lugs of each of the two brake arms, a second end of the second links are pivotably connected to a through hole in each of the two ends of the body.

4. The mechanism as claimed in claim 1, wherein the pivotable member has two top lugs on a center thereof and a securing unit is connected to the two top lugs, the securing unit is connected to an end of the operation cable.

5. The mechanism as claimed in claim 2, wherein a top cap is mounted on the body and includes two second elongate holes which are in alignment with the first elongate holes of the body, the tubes extend through the two second elongate holes.

6. The mechanism as claimed in claim 1, wherein the two pins each have an aperture and a spring clip extends through the aperture to prevent the pin from being pulled backward through the two holes in the two plates of the body.

7. The mechanism as claimed in claim 3, wherein a rod extends through the first end of each of the first links and the first lugs of each of the brake arms to form a first pivotable portion, a bolt extends through the second end of each of the first links, a torsion spring, a support tube for receiving the torsion spring and the connection lugs of each end of the body and is connected to a nut so as to form a first positioning portion, another rod extends through the first end of each of the second links, the tube between the second lugs and the second lugs of each of the brake arms to form a second pivotable portion, another bolt extends through the second end of each of the second links and the through hole of the body and is connected with another nut so as to form a second positioning portion.

* * * * *